(12) United States Patent
Kadrmas et al.

(10) Patent No.: US 8,491,990 B2
(45) Date of Patent: Jul. 23, 2013

(54) FIBER MODIFIED LAYER AND METHODS OF MAKING AND USING SAME

(75) Inventors: Arlis Kadrmas, Wichita, KS (US); Renato Ceccovilli, Broken Arrow, OK (US)

(73) Assignee: Arr-Maz Products, L.P., Mulberry, FL (US)

( * ) Notice: Subject to any disclaimer, the term of this patent is extended or adjusted under 35 U.S.C. 154(b) by 251 days.

(21) Appl. No.: 12/826,353

(22) Filed: Jun. 29, 2010

(65) Prior Publication Data

US 2010/0311873 A1 Dec. 9, 2010

Related U.S. Application Data

(62) Division of application No. 12/252,729, filed on Oct. 16, 2008, now Pat. No. 7,897,254.

(51) Int. Cl.
*D02G 3/00* (2006.01)

(52) U.S. Cl.
USPC ............ 428/294.7; 428/359; 404/17; 404/45; 404/71

(58) Field of Classification Search
USPC ....................... 428/294.7, 359; 404/17, 45, 71
See application file for complete search history.

(56) References Cited

U.S. PATENT DOCUMENTS

| | | |
|---|---|---|
| 1,991,931 A | 2/1935 | Kling et al. |
| 4,242,246 A | 12/1980 | Maldonado et al. |
| 4,330,449 A | 5/1982 | Maldonado et al. |
| 4,379,810 A | 4/1983 | Amundsen et al. |
| 4,502,814 A | 3/1985 | Trimble |
| 4,565,840 A | 1/1986 | Kobayashi et al. |
| 5,226,960 A | 7/1993 | Punkert |
| 5,502,160 A * | 3/1996 | Modrak ........................ 428/359 |
| 6,079,901 A | 6/2000 | Banks et al. |
| 6,197,423 B1 | 3/2001 | Rieder et al. |
| 6,398,453 B1 | 6/2002 | Stegemoeller |
| 6,503,625 B1 | 1/2003 | Rieder et al. |
| 6,830,408 B1 | 12/2004 | Blankenship et al. |
| 6,841,230 B2 | 1/2005 | Yokoo et al. |
| 7,108,450 B2 | 9/2006 | Grubba |
| 7,462,392 B2 | 12/2008 | Ranganathan et al. |
| 7,897,254 B2 * | 3/2011 | Kadrmas et al. .............. 428/359 |
| 2004/0253384 A1 | 12/2004 | Simmons |
| 2006/0130704 A1 | 6/2006 | Partanen |
| 2006/0243170 A1 | 11/2006 | Brouillette et al. |

FOREIGN PATENT DOCUMENTS

| | | |
|---|---|---|
| CN | 1511882 A | 7/2004 |
| EP | 1088798 | 4/2001 |

OTHER PUBLICATIONS

Hernandez-Prewitt, Roger,United States Patent and Trademark Office Office Action for U.S. Appl. No. 13/913,519, filed Oct. 27, 2010, for Inventor Arlis Kadrmas; May 4, 2011; pp. 1-13; U.S. Department of Commerce, Alexandria, VA; U.S.A.
Wilkinson, Cassandra, Head, Johnson & Kachigian, P.C.; Amendment to Office Action for U.S. Appl. No. 12/913,519, Fiber Modified Layer and Methods of Making and Using Same; Aug. 1, 2011; pp. 1-6; Head, Johnson & Kachigian, P.C.; Tulsa, OK; U.S.A.
Construction Division, Texas Department of Transportation: "Overlay test Tex-248-F" (Online) XP002562772 Retrieved from the Internet: URL: ftp://ftp.dot.state.tx.us/pub/txdot-info/cst/TMS/200-F_series/pdfs/bit248.pdf>.
Flordia Department of Transportation Specification, Asphalt Concrete Friction Courses, Section 337: ftp://ftp.dot.state.fl.us/LTS/CO/Specifications/WorkBook/Jan2003/D3370000.do.pdf.
Samir Soliman. Fibrous Microsurfacing: Panorama of Aplications. I.S.S.A./A.E.M.A/A.R.R.A Palm Springs C.A. Convention, Feb. 2006.
Test Procedure for Overlay: TxDot Designation: Tex-248-F. Texas Department of Transportation. Effective Date: Mar. 2007. pp. 1-5 through 5-5.
Ralumac with Fibres. (Online). Jul. 7, 2008, <http://www.btinternet.com/~Derek.Payne3/icb/print/reinforced.htm>. pp. 3-4.
Specification for Fiber Reinforced Coemulsified Latex Modified Asphalt Emulsion Cold Laid Stress at Strain Relieving Membrane. pp. 1-7.
Email chain dated Feb. 1, 2010; first email from Charlie Atherton to Craig McElwain, second email from Craig McElwain to Charlie Atherton, third email from Daniel Quire to Craig McElwain and Charlie Atherton; subject line "Re: MicroTekk agreement—Jan. 29, 2010 meeting with Ben Vagher" (unpublished).

* cited by examiner

*Primary Examiner* — Robert D. Harlan
(74) *Attorney, Agent, or Firm* — Head, Johnson & Kachigian, PC

(57) ABSTRACT

A composition for use in a fiber modified layer, comprising an aggregate material, a binder, and a plurality of fibers, wherein each fiber has a length of greater than 0.25 inches. Also provided is a method of selecting a fiber modified layer for applying on an existing surface, comprising the steps of: providing a binder mixture having an effective amount of an aggregate material, a binder, and a plurality of fibers, wherein each of the plurality of fibers has a length greater than 0.25 inches; applying the binder mixture to a selected surface to form a fiber modified proposed layer; testing the fiber modified proposed layer for fatigue or crack resistant properties; and selecting the binder mixture for application on the existing surface for performance if the fiber modified proposed layer has fatigue or crack resistant properties.

23 Claims, 1 Drawing Sheet

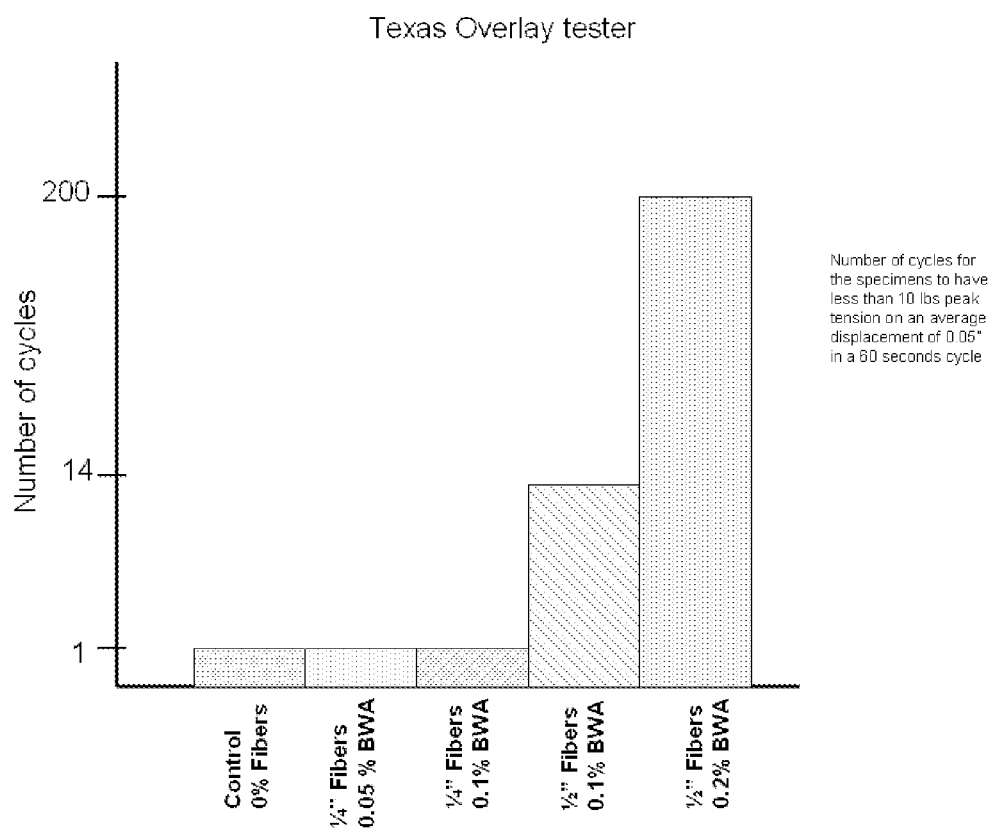

FIBER MODIFIED LAYER AND METHODS OF MAKING AND USING SAME

1. CROSS REFERENCE

This application is a divisional application of U.S. patent application Ser. No. 12/252,729 filed Oct. 16, 2008 now U.S. Pat. No. 7,897,254.

2. FIELD OF THE INVENTION

This invention relates generally to paved surfaces, and more particularly, not by way of limitation, to a fiber modified layer having improved fatigue or crack resistant properties.

3. DESCRIPTION OF THE RELATED ART

One of the most adaptable tools in road maintenance is slurry mixture. Slurry mixture is a polymer-modified cold-mix paving system that can remedy a broad range of problems on today's streets, highways, and airfields. Slurry mixture begins as a mixture of dense-graded aggregate, asphalt emulsion, water, additives, recycled materials, and mineral fillers. While conventional slurry seal is used around the world as an economical treatment for sealing and extending the service life of both urban and rural roads, slurry mixture has added capabilities, due to the use of high-quality, carefully monitored materials, including advanced polymers and other modern additives. Slurry mixture is recognized as a cost-effective way to treat surface wheel-rutting problems and a variety of other road surface problems. Slurry mixtures are hereafter referenced only as slurry mixture.

Slurry mixture is made and applied to existing pavements by a specialized machine, which mixes the components on site, and spreads the mixture onto the road surface. Materials are continuously and accurately measured, and then thoroughly combined in the slurry mixture machine's mixer. As the machine moves forward, the mixture is continuously fed into a variable-width "surfacing" box which can apply materials to the width of a traffic lane in a single pass. Alternately, specially engineered "rut" boxes, designed to deliver the largest aggregate particles into the deepest part of the rut to give maximum stability in the wheel path, may be used. Edges of the slurry mixture are automatically feathered. The new surface is initially a dark brown color and changes to the finished black surface as the water is ejected and the surface cures, permitting traffic within one hour in most cases. Continuous-load pavers utilize support units that bring the materials to the job site and load the machine while it is working, thus maximizing production and minimizing transverse joints.

Because slurry mixtures can be effectively applied to most surfaces, more area is covered per ton of mix, resulting in cost-effective surfacing. Traditional hot mix used approximately 165 lbs to 220 lbs of mixture to apply a 1.5 inch to 2 inch layer over a 1 square yard area. Conversely, slurry mixtures typically use 15 lbs to 30 lbs of mixture per square yard to provide a suitable surface. Slurry mixtures also create a new, stable surface that is resistant to rutting and shoving in summer. The mixture fills in cracks and surface imperfections. Because of its quick-traffic properties, slurry mixture can be applied in a broad range of temperature and weather conditions, effectively lengthening the paving season.

Slurry mixture begins with the selection of high-quality materials—asphalt emulsion, aggregate, emulsifiers, water, and additives—which must pass special laboratory tests, both individually and when combined, as a slurry mixture system. The International Slurry Surfacing Association's (ISSA) broad range of specialized mix design tests help to insure that the mixture has the desired slurry mixture characteristics.

To this end, although slurry mixture as currently practiced is an efficient road maintenance process, further improvements are desirable to a process for enhancing the fatigue resistant properties of paved surfaces. It is to such a fiber modified layer and method of selection and use that the present invention is directed.

Fibers have been used to enhance the crack resistance of paved layers like slurry seal and slurry mixture. The known art used a variety of fibers $\leq 0.25$ inches in length to enhance the crack resistant properties of the layer. When tested for crack resistance like the ISSA Flexural Bend Test crack resistance was enhanced by using fibers.

While fatigue resistance, fracture energy, and fracture toughness of the mixture can be somewhat enhanced by $\leq 0.25$ inch fibers, surprisingly crack resistance is generally unaffected.

Literature is laden with grid, mat, and lattice systems to assist crack resistance in road construction and rehabilitation. These processes have many drawbacks. They are expensive, require an extraordinary amount of fiber type materials and are difficult to construct.

Accordingly, it is desirable to provide a fiber modified layer with enhanced fatigue and crack resistant properties.

SUMMARY OF THE INVENTION

In general, in a first aspect, the present invention relates to a method of selecting a fiber modified layer for applying on an existing surface, comprising the steps of: providing a binder mixture having an effective amount of an aggregate material, a binder, and a plurality of fibers, wherein each of the plurality of fibers has a length greater than 0.25 inches; applying the binder mixture to a selected surface to form a fiber modified proposed layer; testing the fiber modified proposed layer for fatigue or crack resistant properties; and selecting the binder mixture for application on the existing surface if the fiber modified proposed layer has fatigue or crack resistant properties.

The aggregate material may be mineral aggregates, such as sand, stone, lime, Portland cement, kiln dust, or mixtures thereof; man made aggregates, such as wet bottom boiler slag, blast furnace slag, or mixtures thereof; recycled materials, such as reclaimed asphalt pavement, glass, ground rubber tires, ceramics, metals, or mixtures thereof; or mixtures thereof. The binder may be an asphalt emulsion, hot asphalt cement, hot polymer modified asphalt cement, petroleum solvent cutback asphalt, polymer modified petroleum solvent cutback asphalt, resinous hydrocarbons, emulsified resinous hydrocarbons, emulsified polymer modified resinous hydrocarbons, or mixtures thereof. If the binder is an asphalt emulsion, it may be elastomer modified or polymer modified, and the polymer may be natural latex, SBR latex, or neoprene latex and the like. The plurality of fibers may be synthetic fiber, glass fiber, metallic fiber, steel fiber, boron fiber, aluminum fiber, acrylic fiber, nylon fiber, rayon fiber, polyester fiber, polystyrene fiber, cellulose acetate fiber, acetate base fiber, polypropylene fiber, polyacrylamide fiber, polyethylene fiber, carbon fiber, aramid fiber, or mixtures thereof. The fibers may each have a length of greater than 0.25 inches. The binder mixture may further comprise one or more additives, including adhesion promoters, surfactants, polymers, cross-linking agents, vulcanization agents, accelerators, extenders, or fluxing agents.

Testing the fiber modified proposed layer for crack resistant properties may further comprise using a Texas Overlay test. Testing may further comprise using a modification of TxDOT Test Method T-248-F. The fiber modified proposed layer may be determined to have fatigue or crack resistant properties if testing results in a number of cycles to failure greater than 3 where displacement is 0.05 inches, cycle time is 60 seconds, and temperature is 5° Celsius. The fiber modified proposed layer may also be tested using flexibility tests, bending tests, or fracture energy and fracture toughness tests, such as the Flexural Bend test, ISSA TB146 or the Disk-shaped Compact Tension Test, ASTM D7313-07.

The method of selecting a fiber modified layer for applying on an existing surface may further comprise applying the selected fiber modified proposed layer having crack resistant properties to the existing surface. The existing surface may have a direction of travel, and the method may further comprise preferentially aligning the plurality of fibers in the binder mixture in the direction of travel.

In general, in a second aspect, the present invention relates to a composition for use in a fiber modified layer, comprising an aggregate material, a binder, and a plurality of fibers, wherein each fiber has a length of greater than 0.25 inches. The composition may further comprise one or more additives.

The aggregate material may be mineral aggregates, such as sand, stone, lime, Portland cement, kiln dust, or mixtures thereof; man made aggregates, such as wet bottom boiler slag, blast furnace slag, or mixtures thereof; recycled materials, such as reclaimed asphalt pavement, glass, ground rubber tires, ceramics, metals, or mixtures thereof; or mixtures thereof. The binder may be an asphalt emulsion, hot asphalt cement, hot polymer modified asphalt cement, petroleum solvent cutback asphalt, polymer modified petroleum solvent cutback asphalt, resinous hydrocarbons, emulsified resinous hydrocarbons, emulsified polymer modified resinous hydrocarbons, or mixtures thereof. If the binder is an asphalt emulsion, it may be elastomer modified or polymer modified, and the polymer may be natural latex, SBR latex, or neoprene latex. The plurality of fibers may be synthetic fiber, glass fiber, metallic fiber, steel fiber, boron fiber, aluminum fiber, acrylic fiber, nylon fiber, rayon fiber, polyester fiber, polystyrene fiber, cellulose acetate fiber, acetate base fiber, polypropylene fiber, polyacrylamide fiber, polyethylene fiber, carbon fiber, aramid fiber, or mixtures thereof. The fibers may each have a length of greater than 0.25 inches. Each of the additives may be adhesion promoters, surfactants, polymers, cross-linking agents, vulcanization agents, accelerators, extenders, or fluxing agents.

The composition may demonstrate fatigue or crack resistant properties when tested using a Texas Overlay test. Testing may further comprise using a modification of TxDOT Test Method T-248-F. The composition may be determined to have fatigue or crack resistant properties if such testing results in a number of cycles to failure greater than 3 where displacement is 0.05 inches, cycle time is 60 seconds, and temperature is 5° Celsius. The composition may also be tested using flexibility tests, bending tests, or fracture energy and fracture toughness tests, such as the Flexural Bend test, ISSA TB146 or the Disk-shaped Compact Tension Test, ASTM D7313-07.

The composition may be such that the application of the composition to an existing surface results in the preferential alignment of the plurality of fibers. Further, where the existing surface has a direction of travel, the application of the composition to the existing surface along the direction of travel may result in the preferential alignment of the plurality of fibers along the direction of travel.

Finally, in a third aspect, the present invention relates to a fiber modified layer comprising a binder mixture having an effective amount of an aggregate material, a binder, and a plurality of fibers, wherein each of the plurality of fibers has a length greater than 0.25 inches, and where the binder mixture has been applied to an existing surface. The existing surface may have a direction of travel, and the binder mixture may be applied to the existing surface along the direction of travel. The plurality of fibers may be preferentially aligned in the direction of travel. The preferentially aligned plurality of fibers may provide fatigue or crack resistant properties to the fiber modified layer. These properties may be demonstrated through testing.

DETAILED DESCRIPTION OF THE DRAWINGS

FIG. 1 is a graph showing the results of the Texas Overlay Tester.

DETAILED DESCRIPTION OF THE PREFERRED EMBODIMENTS

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In the present invention, a composition for a pavement layer is provided. The composition may include an asphalt emulsion, aggregate material, and a plurality of fibers wherein each of the plurality of fibers has a length greater than 0.25 inches. A method for applying a surface is also provided. The method may comprise adding a sufficient amount of recycled materials, mineral fillers, and water to an aggregate of suitable quality. The components are mixed thoroughly. Fibers of suitable quality are added and mixed into the system. Finally, binder is stirred into the mixture and it is immediately applied. The application of the mixture preferentially aligns fibers greater than 0.25 inches substantially perpendicular to transverse cracks thereby increasing the resistance to cracking and fatigue.

The fiber modified layer has crack resistant, fatigue resistant properties with enhanced fracture energy and fracture toughness disposed on an existing surface. Broadly, the fiber modified layer may include an effective amount of a fiber modified mixture of a binder, aggregate, additives, and a plurality of fibers.

The binder contains bitumen (asphalt) and other additives suitable for use in bituminous binders, such as adhesion promoters, surfactants, polymers, cross-linking agents, vulcanization agents, accelerators, extenders, fluxing agents, and the like. The additives used for fabricating the binder are selected based on the desired properties of the binder for a given application of the fiber modified layer.

Polymer-modified or elastomer-modified binders may be used. Suitable elastomers are described in but not limited to U.S. Pat. No. 4,242,246, issued to Maldonado et al. on Dec. 30, 1980, the entirety of which is hereby incorporated herein by reference. Suitable polymer cross-linking technologies that can be utilized are described in but not limited to U.S. Pat. No. 4,330,449, issued to Maldonado et al. on May 18, 1982, the entirety of which is hereby incorporated herein by reference. In addition, binders as described in U.S. Pat. No. 6,830,408, issued to Blankenship et al. on Dec. 14, 2004, the entirety of which is hereby incorporated herein by reference, may be used. Additionally, latex products like natural latex, SBR latex, neoprene latex, and the like are suitable polymers. Polymer loadings may be greater than 0.5% up about 20% based on the weight of the binder. Additionally, all polymers are not water soluble.

The binder may be in the form of an asphalt emulsion or a polymer modified asphalt emulsion. In other embodiments, the binder may be hot asphalt cement, hot polymer modified asphalt cement, petroleum solvent cutback asphalt, polymer modified petroleum solvent cutback asphalt, resinous hydrocarbons, emulsified resinous hydrocarbons, emulsified polymer modified resinous hydrocarbons, and the like.

The aggregate of the fiber modified layer provides support and structure to the fiber modified layer to resist cracking, fatigue, and rutting. The aggregate may be sized and shaped so as to provide sufficient structure and support thereby resisting the formation of ruts in the fiber modified layer and may be blended to various graded specifications. Examples of aggregate may include, but are not limited to, mineral aggregates, such as sand, stone, lime, Portland cement, kiln dust, and combinations thereof and may be crushed or rounded, high quality coarse and fine. Other suitable aggregates are man made aggregates like wet bottom boiler slag, blast furnace slag, and the like. Alternately, recycled materials like reclaimed asphalt pavement (RAP), glass, ground rubber tires, other ceramics, metals, and the like can be substituted in part or in whole for the aggregate and is generally considered as aggregate. It should be understood and appreciated that the aggregates used in accordance with the present invention may be any suitable material known in the art for use as aggregates in asphalt paving applications. The aggregate may be added to the fiber modified layer in any amount sufficient to provide support and structure to the fiber modified layer to resist cracking, enhance fatigue properties, and maintain stability of the fiber modified layer.

The ISSA (International Slurry Surfacing Association) is the commonly known industry leader for slurry mixture and slurry surfacing applications throughout the world. The ISSA has an industry minimum standard for aggregate cleanliness of 65%. Aggregate cleanliness, or sand equivalent value, for aggregate is typically above 80%. Sand is typically not added to aggregate, but embodiments exist where sand is added. In one embodiment, although sand is not added to aggregate, crushing of the limestone or other minerals for aggregate follows the gradation detailed, and generally is considered to be "sand" since it is typically close to meeting most sand specifications as well as the sand equivalent value of soils and fine aggregate test.

The plurality of fibers of the present invention may be any such fiber utilized in the surfacing process. Examples of synthetic fibers include, but are not limited to, glass fiber, metallic fiber such as steel fiber, which includes boron fiber and aluminum fiber, acrylic fiber, nylon fiber, rayon fiber, polyester fiber, polystyrene fiber, cellulose acetate fiber, acetate base fiber, polypropylene fiber, polyacrylamide fiber, polyethylene fiber, carbon fiber, and aramid fiber. Each of the plurality of fibers has a length greater than 0.25 inches. Fibers longer than 0.25 inches provide enhanced crack resistance and, when applied with a suitable "surfacing" box, the fibers will preferentially align substantially perpendicular to transverse cracks increasing the resistance to cracking and fatigue.

Additives are incorporated in a suitable manner and in sufficient quantities to control consistency and other properties of the mixture. These additives consist of but are not limited to Portland cement, mineral fillers, recycled materials, sodium sulfates, calcium sulfates, water, surfactants, breaking agents, coating agents, and the like.

Various mixtures may be created when forming the fiber modified layer. Different proportions of different binders, different binder amounts, different binder concentrations, different fibers, different fiber amounts, different lengths of fibers, and various aggregate gradations can be formed to increase fatigue and fracture resistance. The crack resistant mixture formed has the physical properties and performance characteristics to make a crack resistance layer that has good fatigue resistance.

The fiber modified layer can be fabricated such that it has a predetermined level of fatigue resistance. The fatigue resistance of the fiber modified layer can be determined by measuring the number of cycles to failure of a test specimen of the fiber modified layer when subjected to suitable strains. Measurements of fatigue resistance include but are not limited to Flexural Beam Fatigue Test AASHTO T321-03 or D7460-08, or the TX Overlay Tester TxDOT T-248-F.

A fatigue-resistant layer of a road may be created from the bituminous mixture of the present invention. The bituminous mixture can be used for various paving applications, such as to make under layers, interlayers, and overlays. Such layers have the ability to retard the formation and severity of reflective cracks and to increase fatigue resistance.

The mixture can be tested for its resistance to cracking using a crack resistance test. The crack resistance test can be any type of test for measuring the resistance of the mixture to cracking Examples of crack resistant tests include, but are not limited to, flexibility tests, bending tests, fracture energy and fracture toughness tests, and the like. An example of a bending test is the Flexural Bend test (ISSA TB146). An example of a fracture energy or fracture toughness test is the Disk-shaped Compact Tension test [DC(T)] ASTM D7313-07. An example of a cracking test is the Texas Overlay test (TxDOT T-248-F). It should be understood and appreciated that any test known in the art capable of determining the cracking resistance, fracture energy, or fracture toughness of the mixture can be implemented in accordance with this invention.

The enhanced cracking and fatigue resistance of the fiber modified layer is due to the orientation of the fiber in the mixture relative to any preexisting or future crack in the surface. The ligament bridges the crack gap and provides enhanced fatigue and crack resistance.

The specialized machine that mixes the materials in place also applies the product to the surface. The machine spreads the mixture onto the surface using a suitable spreading device. The specialized machine may apply the slurry mixture longitudinally to the normal direction of traffic. In this embodiment, the combination of the direction of travel of the specialized machine and the suitable spreading device preferentially aligns fibers of sufficient length in the direction of forward movement. Suitable fibers are preferentially aligned substantially perpendicular to transverse cracks enabling enhanced crack and fatigue resistance. In another embodiment, the fibers are randomly aligned in the mixture that is applied to the surface. Fiber lengths greater than 0.25 inches provide sufficient ligaments that cross the existing or future cracks enabling enhanced fatigue and crack resistance.

The application of the bituminous fiber mixture can be achieved with any suitable "surfacing" box that applies the bituminous fiber mixture to a surface. Preferably, the surfacing box applies the bituminous fiber mixture whereby the direction of travel is substantially perpendicular to transverse crack and preferentially orients the fibers in the direction of travel. The surfacing box can be but is not limited to equipment such as asphalt pavers made by Barber Greene or Blaw-Knox, drag boxes similar to U.S. Pat. No. 7,108,450 to Grubba, spreader boxes similar to U.S. Pat. No. 6,398,453 to Stegemoeller, paving machines similar to U.S. Pat. No. 6,079,901 to Banks, and the like.

In a further embodiment of the present invention, a method of selecting a mixture of the fiber modified layer is provided. A mixture, such as that described herein, is selected for fabricating the fiber modified layer according to one or more of the tests described above.

In order to further illustrate the present invention, the following example is given. However, it is to be understood that the example is for illustrative purposes only and are not to be construed as limiting the scope of the subject invention:

EXAMPLE

The binder was an asphalt emulsion using a base asphalt of PG64-22, Ralumac® slurry mixture chemistry at a suitable pH and about 3.75% natural latex based on the weight of the asphalt.

The aggregate was a chat aggregate from Bingham Sand and Gravel (Joplin, Mo.) substantially conforming to a ISSA type III gradation. The mineral filler was Portland cement at about 1% for all mixtures.

The fibers were Polyester fibers of 0.25-1 inch in length and various denier thicknesses.

No recycled materials were utilized but a typical Ralumac control additive was used to control mixing and set times, and water was used to provide sufficient fluidity to the mixture.

The composition was produced by mixing the Portland cement together with the aggregate. The water and additives were added to the composition and sufficiently mixed. The asphalt emulsion was added to the composite at about 13% based on the weight of the mixture. Finally, polyester fibers were added and sufficiently mixed.

The resulting mixture was suitably poured into a mold of sufficient size for testing. The Texas Overlay tester was used to evaluate the samples following a variation on standard operating procedure TxDOT T-248-F. The testing included the following adjustments to the TxDOT T-248-F test procedure as promulgated by the Texas Department of Transportation in March 2007:

2. Apparatus 2.1 Change the maximum displacement from 0.025 in to 0.05 in. Change the cycle time from 10 seconds to 60 seconds.

2.2 Delete 2.4 Delete

4 Specimens 4.1 Replace with: "Laboratory Molded Specimens—Prepare specimens according to ISSA TB-100 and TB-147. Specimens size should be 6 in. long by 3 in. wide by 0.5 in. tall"

4.2 Delete

5 Procedure 5.1 Delete 5.2 Delete 5.3 Delete the last paragraph 5.6 Change the constant temperature from 77±3° F. to 41±2° F. Replace the third paragraph with: "Start the test by enabling the start button in the program. Perform testing until the maximum load measured is less than 10 pounds. If that is not reach, run test to 1,200 cycles."

6 Report 6.1 Delete "Percent decline in load"

The foregoing procedure is hereinafter referred to as the "Modified TxDOT T-248-F" procedure. The following samples were tested using the Modified TxDOT T-248-F procedure:

Sample A—control sample with 0% fibers

Sample B—0.05% based on the weight of the aggregate 0.25 inch fibers

Sample C—0.10% based on the weight of the aggregate 0.25 inch fibers

Sample D—0.10% based on the weight of the aggregate 0.50 inch fibers

Sample E—0.20% based on the weight of the aggregate 0.50 inch fibers

Test data shown in FIG. 1.

Any bituminous fiber mixture representing enhanced fatigue or crack resistance relative to the control is considered an object of this invention. Preferably, the Modified Texas Overlay Test is utilized and any bituminous fiber mixture exhibiting 3 or greater cycles to failure is considered to have improved fatigue or crack resistance of the mixture; most preferably is any bituminous fiber mixture exhibiting 5 or greater cycles to failure From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A composition for use in a fiber modified layer, comprising:
   an aggregate material;
   a binder, where the binder is an asphalt emulsion; and
   a plurality of fibers, wherein each fiber has a length of greater than 0.25 inches
   wherein the plurality of fibers do not include polyolefin-polyarylate alloy fibers or fiberglass.

2. The composition of claim 1 wherein the aggregate material is mineral aggregates, man made aggregates, recycled material, or mixtures thereof.

3. The composition of claim 2 wherein the mineral aggregates are sand, stone, lime, Portland cement, kiln dust, or mixtures thereof.

4. The composition of claim 2 wherein the man made aggregates are wet bottom boiler slag, blast furnace slag, or mixtures thereof.

5. The composition of claim 2 wherein the recycled materials are reclaimed pavement, glass, ground rubber tires, ceramics, metals, or mixtures thereof.

6. The composition of claim 1 wherein the asphalt emulsion is elastomer modified.

7. The composition of claim 1 wherein the asphalt emulsion is polymer modified.

8. The composition of claim 7 wherein the polymer is natural latex.

9. The composition of claim 7 wherein the polymer is SBR latex or neoprene latex.

10. The composition of claim 1 wherein the binder is an asphalt emulsion, hot asphalt cement, hot polymer modified asphalt cement, petroleum solvent cutback asphalt, modified petroleum solvent cutback asphalt, resinous hydrocarbons, emulsified resinous hydrocarbons, emulsified polymer modified resinous hydrocarbons, or mixtures thereof.

11. The composition of claim 1 wherein the plurality of fibers is formed from polyester.

12. The composition of claim 1 wherein the plurality of fibers is synthetic fibers, glass fibers, metallic fibers, steel fibers, boron fibers, aluminum fibers, acrylic fibers, nylon rayon fibers, polyester fibers, polystyrene fibers, cellulose acetate fibers, acetate base fibers, polypropylene fibers, polyacrylamide fibers, polyethylene fibers, carbon fibers, aramid fibers, or mixtures thereof.

13. The composition of claim 1 wherein each of the plurality of fibers has a length at least 0.5 inches.

14. The composition of claim 1 further comprising one or more additives.

15. The composition of claim 14 wherein each of the one or more additives is adhesion promoters, surfactants, polymers, cross-linking agents, vulcanization agents, accelerators, extenders, or fluxing agents.

16. The composition of claim 1 wherein the composition demonstrates fatigue or crack resistant properties when tested using a Texas Overlay test in accordance with TxDOT T-T-248-F.

17. The composition of claim 1 wherein the composition demonstrates fatigue or crack resistant properties when tested using a Texas Overlay test in accordance with Modified TxDOT T-248-F.

18. The composition of claim 17 wherein the Texas Overlay test results in a of cycles to failure greater than 3 where displacement is 0.05 inches, cycle time is 60 seconds, temperature is 5° Celsius.

19. The composition of claim 1 wherein the composition demonstrates fatigue or crack resistant properties when tested using flexibility tests, bending tests, or fracture energy and fracture toughness tests.

20. The composition of claim 1 wherein the composition demonstrates fatigue or crack resistant properties when tested using the Flexural Bend test, ISSA TB146.

21. The composition of claim 1 wherein the composition demonstrates fatigue or crack resistant properties when tested using the Disk-shaped Compact Tension test, ASTM D7313-07.

22. The composition of claim 1 wherein application of the composition to an existing surface results in the preferential alignment of the plurality of fibers.

23. The composition of claim 22 wherein the existing surface has a direction of travel and application of the composition to the existing surface along the direction of travel in the preferential alignment of the plurality of fibers along the direction of travel.

* * * * *